United States Patent [19]

Ishigami et al.

[11] Patent Number: 4,882,684
[45] Date of Patent: Nov. 21, 1989

[54] ENGAGING DEVICE OF A KEYBOARD FOR A DATA PROCESSING UNIT

[75] Inventors: Michifumi Ishigami; Toyonori Sasaki, both of Nagoya, Japan

[73] Assignee: Brother Kogyo Kabushiki Kaisha, Aichi, Japan

[21] Appl. No.: 135,274

[22] Filed: Dec. 21, 1987

[30] Foreign Application Priority Data

Dec. 25, 1986 [JP] Japan .............................. 61-202229

[51] Int. Cl.⁴ .............................................. G06F 15/00
[52] U.S. Cl. .................................................. 364/708
[58] Field of Search ................ 364/708; 361/393-394; 312/208, 282; 16/254, 260; 248/293

[56] References Cited

U.S. PATENT DOCUMENTS

| | | | |
|---|---|---|---|
| 4,496,943 | 1/1985 | Greenblatt | 364/708 X |
| 4,516,508 | 5/1985 | Kako et al. | 400/83 |
| 4,620,808 | 11/1986 | Kurtin et al. | 108/7 |
| 4,669,053 | 5/1987 | Krenz | 364/708 |
| 4,704,604 | 11/1987 | Fuhs | 340/700 |
| 4,730,364 | 3/1988 | Tat-Kee | 364/708 X |
| 4,736,332 | 4/1988 | Crease | 364/708 |
| 4,781,422 | 11/1988 | Kimble | 312/72 |

FOREIGN PATENT DOCUMENTS

| | | | |
|---|---|---|---|
| 60-160418 | 8/1985 | Japan | 364/708 |
| 60-189523 | 9/1985 | Japan | 364/708 |

Primary Examiner—Gary V. Harkcom
Assistant Examiner—Tan V. Mai
Attorney, Agent, or Firm—Oliff & Berridge

[57] ABSTRACT

One end of a keyboard is raised or lowered for easy keying operation. By turning knobs on both sides of a keyboard, an inclination of the board can be arbitrarily adjusted as required for an operator. Additional plugs or connecting parts are not required to connect the keyboard to a data processing unit and set it in position. The keyboard can be engaged with the data processing unit by inserting a pair of leg members, each of which is respectively constructed in one unit to detachably connect the keyboard into slots of the data processing unit.

11 Claims, 4 Drawing Sheets

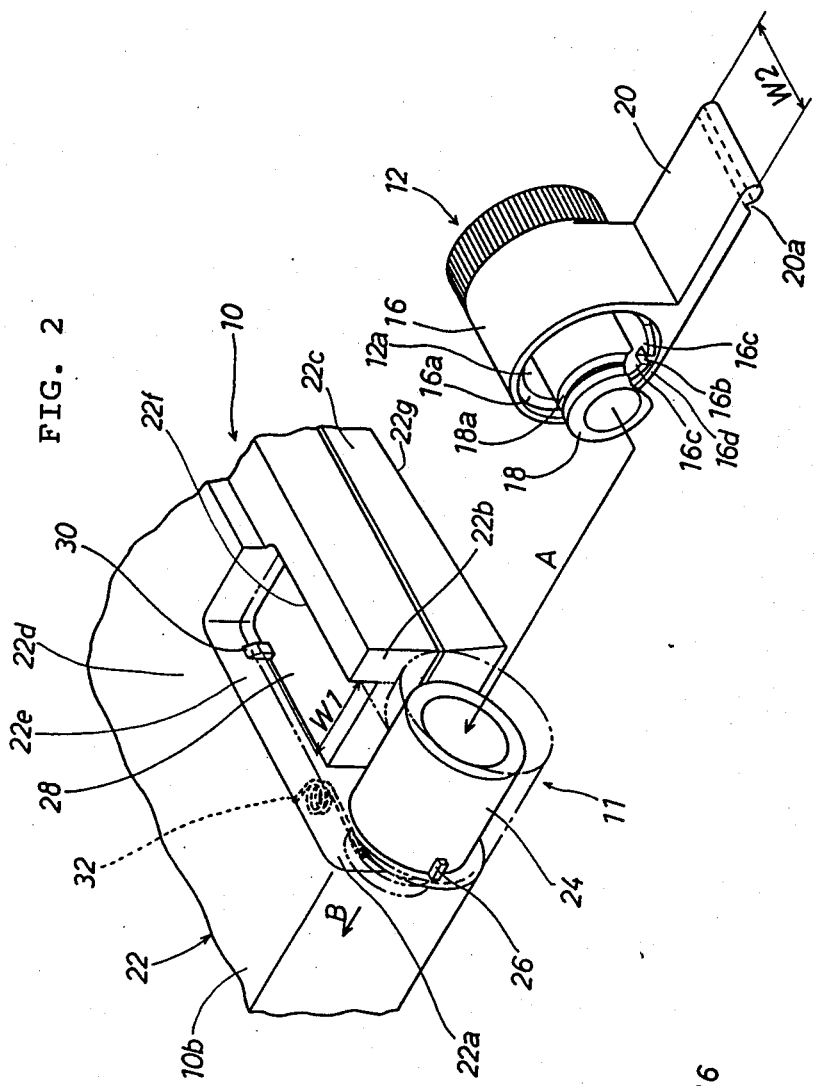
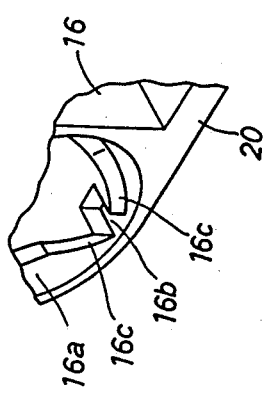

ENGAGING DEVICE OF A KEYBOARD FOR A DATA PROCESSING UNIT

BACKGROUND OF THE INVENTION

1. Field of the Invention

This invention relates to an engaging device of a keyboard for a data processing unit.

2. Description of Prior Art

There are several conventional devices for engaging an independent keyboard with a mating part of a data processing unit. Using these devices, it is well known that a connecting member such as a counter-J type hook being projected from an end of the keyboard panel and a bar-type engaging means arranged under the mating part of data processing unit are used simultaneously to engage the independent keyboard with the mating part of data processing unit equipped with a printer and CRT, etc. When in use, the counter-J type hook is hung on the bar-type engaging means on the data processing unit and disengaged therefrom when out of use.

Additionally, the independent keyboard is provided with a tilting device on the bottom thereof to tilt the keyboard body while it is being engaged with the data processing unit. However, the counter-J type engaging means projects from the keyboard and is liable to be caught on the sleeves of an operator when the keyboard is disengaged from the data processing unit. Thus, this engaging means is an obstacle to the keyboard operation.

Since the hook is fixed to the opposite side of the keyboard against the operator, it is difficult for the operator to clearly see the engaging parts when he tilts the keyboard and hangs the hook on the bar-type engaging device and disengages therefrom. Further, every time the tilting device is used, the independent keyboard panel must be reversed since the tilt device is equipped on the bottom side of the independent keyboard. The prior art of this invention is disclosed in U.S. Pat. No. 4,516,508 and U.S. Pat. No. 4,620,808.

SUMMARY OF THE INVENTION

It is time consuming and tedious to join engaging parts of the keyboard and the data processing unit each time the keyboard is used with the data processing unit. Engaging the keyboard with the data processing unit is often difficult when engaging parts are out of the view of the operator. It is therefore desirable to provide a keyboard and data processing unit that are connected in a one-touch operation. Accordingly, an object of this invention is to provide a keyboard engaging device in which the keyboard can be easily engaged with and disengaged from the data processing unit unlike the prior procedures such as hanging the keyboard hook on the bar of the data processing unit.

According to the instant invention, engaging leg pieces of leg members can be directed to be inserted into slots of the data processing unit by rotating knurlings on both sides of the keyboard, thus enabling the keyboard to be connected to the data processing unit easily. Thus the keyboard of the instant invention need not be reversed each time it is engaged with the data processing unit.

Thanks to this engaging device, the operator can be relieved of the fatigue caused by prior procedures. Operational mistakes are simultaneously eliminated because nothing is projected from the surface of the keyboard which hinders keying operation.

In general, the foregoing and other objects will be carried out by providing in combination with a keyboard detachably mounted onto a body of a data processing unit an engaging device which comprises engaging means formed at a front lower portion of the body of the data processing unit and extending rearwardly in the body; and leg means rotatably mounted on the keyboard and disengageably engaging with the engaging means.

BRIEF DESCRIPTION OF DRAWINGS

FIG. 2 is an exploded perspective view of a bottom rear corner of an independent keyboard.

FIG. 3 is a fragmentary view of a leg member.

DETAILED DESCRIPTION

Figure 1:
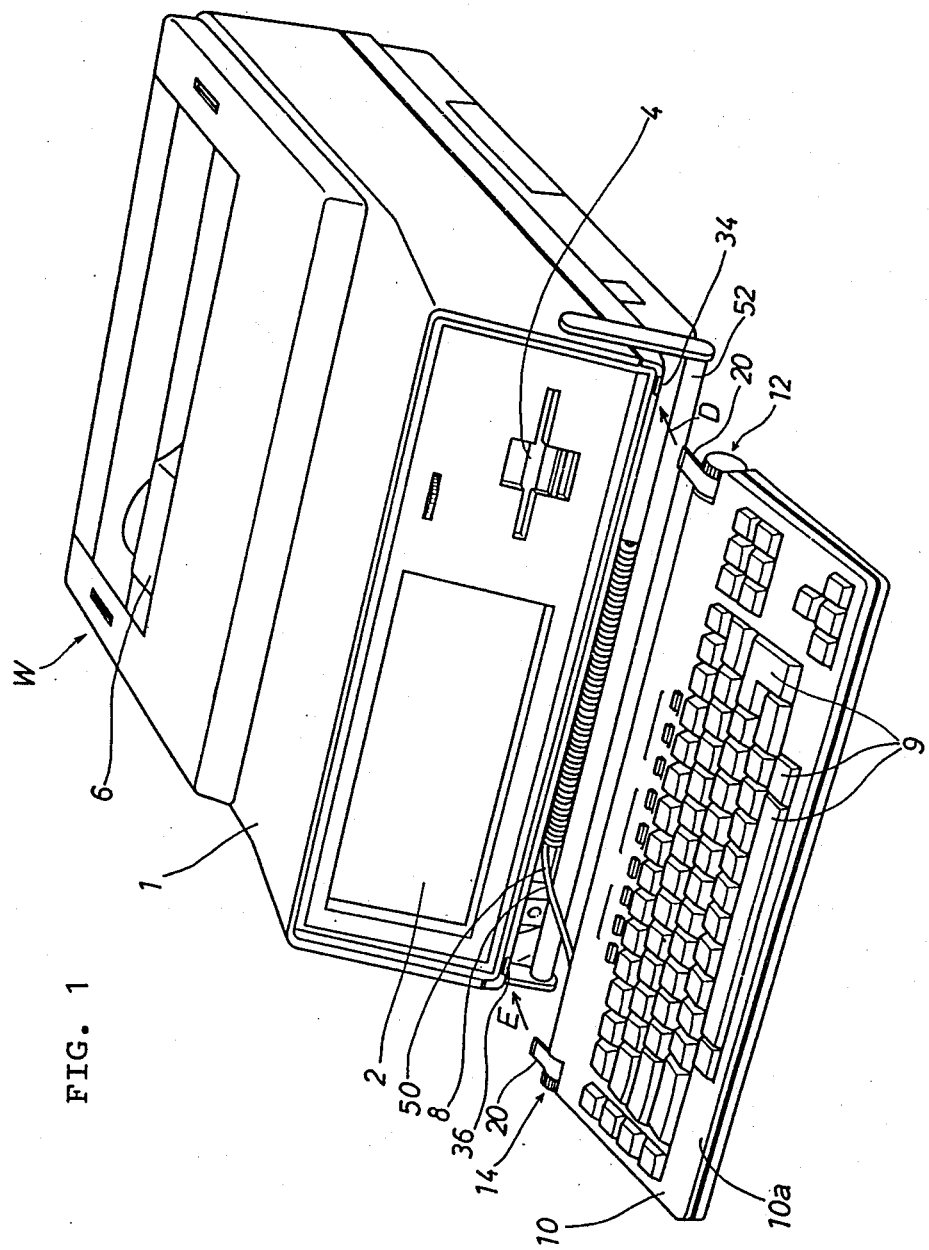
FIG. 1 is a perspective view of a word processor in which a keyboard engaging device is used according to one preferred embodiment of the present invention.

Refering now to FIG. 1, a word processor W is equipped with a CRT 2 housed at a front inside of a body cover 1, a floppy disk drive equipment 4, a typewheel printer 6 housed at a rear of the body cover 1, and an independent keyboard 10 connected to one end of a curl cord 8. This independent keyboard is provided with arrays of keys 9 on the front surface 10a and a pair of housings 11 at both rear corners of the keyboard body 22 which are cut away containing the front surface 10a and the reverse surface 10b. This independent keyboard 10 is provided with leg members 12 and 14 on respective sides thereof which are of symmetrical construction. The description of each leg member is made in detail with reference to leg member 12, as shown in FIG. 2.

The leg member 12 is formed having a roller contour and is provided with an outer cylinder 16 having a bottom 16d on a lower end thereof having an inner cylinder 18, one end connected to the bottom 16d of the outer cylinder 16 and coaxially arranged therewith and the other end projecting from an end of the outer cylinder 16, and a leg piece 20 of a proper length extending from the outer cylinder 16 in a tangential direction thereof.

The tip of leg piece 20 is formed with a recess 20a which is parallel with an axis of the outer cylinder 16. A circumferencial recess 18a is formed on a tip of the outer periphery of inner cylinder 18. At one end of outer cylinder 16, there is a stepped peripheral recess having a ring-shaped surface 16a formed normal to and inner on an inner surface of outer cylinder 16.

On a portion of stepped recess 16a opposing bottom 16d of outer cylinder 16 is arranged a rectangular recess 16b in the diametrical direction and normal to the extended direction of the leg piece 20. On each side of rectangular recess 16b is formed a bank 16c gradually being lowered away therefrom (see FIG. 3). The leg pieces 20 of the leg members 12 can be housed respectively in the housings 11 of the keyboard body 22.

A pair of planes 22a and 22b are formed at each of the rear end corners of keyboard body 22 when the housings 11 are formed at the rear end corners. The plane 22a is parallel with a side plane 22c of the keyboard body 22 and the plane 22b is normal thereto. A cylindrical shaft 24 is normally projected from the parallel plane 22a and a rectangular convex part 26 is formed on a circumferential surface of the cylindrical shaft 24 at a corner portion between the cylindrical shaft 24 and the parallel plane 22a in order to be engaged with the rectangular recess 16b of the outer cylinder 16.

Further, a concave part 28 having a desired depth and adjacent to the parallel plane 22a is formed on a lower surface 22d of the keyboard body 22l and a convex wedge 30 is formed on a side 22e, connecting with the plane 22a, of the concave part 28. A width W1 between the convex wedge 30 and another side 22f of concave part 28 is a little smaller than a width W2 of the leg piece 20 of leg member 12 (0.1 to 0.4 mm according to this embodiment).

On the other hand, the normally intersected plane 22b is provided with slopes having a summit at the center thereof, the plane 22b intersects normally with the lower surface 22d and an upper surface 22g of keyboard body 22. The leg member 12 is coupled in the direction shown by an arrow A to the cylindrical shaft 24 of keyboard body 22 by inserting the cylindrical shaft 24 into a hollow cylindrical portion 12a between the outer cylinder 16 and the inner cylinder 18. The inner cylinder 18 is passed through the cylindrical shaft 24 and projected into the inside of the keyboard body 22.

One end of a torsion coil spring 32 is arranged inside the keyboard body 22 and the other end of torsion coil spring 32 is engaged with the circumferential recess 18a. The cylindrical shaft 24 is activated by the spring 32 in the direction shown by an arrow B and thereby the leg member 12 is connected rotatably with the keyboard body 22. The upper surface 22g of keyboard body 22 is inclined approximately 5 degrees over the lower surface 22d. On the other hand, there are two lateral engaging holes 34, 36 provided at a lower front part of a body cover 1 to be engaged with the leg pieces 20 of the leg members 12. These engaging holes 34 and 36 are of the same configuration and are provided at the same altitude and the same interval as those of the both leg members 12 and 14.

Engaging hole 34 is explained with reference to FIG. 4 and FIG. 5. The size of engaging hole 34 of body cover 1 is a little larger than that of leg piece 20 of leg member 12 and is inclined downward approximately 18 degrees from the horizontal line. On an upper edge of the hole 34 is mounted a plastic locking plate 38 declining rearwardly and downwardly. The width of locking plate 38 is smaller than that of leg piece 20 of leg member 12.

A convex part 38a is provided on the lower end of locking plate 38 in order to be engaged with the recess 20a of the leg piece 20. On respective sides of locking plate 38 are provided ribs 40, 42 which extend from the upper edge of engaging hole 34 along the engaging hole 34 with a downward inclination at the smaller intervals than the width of leg piece 20. Projected portions 40a and 42a are formed under the sides of the ribs 40 and 42 which are interconnected with the upper edge of the engaging hole 34 are formed projected portions 40a and 42a.

Under the locking plate 38 is disposed a lower rib 44 which is extended in the direction of engaging hole 34 from a position a little lower than the lower edge of engaging hole 34. Moreover, a chamfering of approximately 45 degrees is made on the outer and lower end of engaging hole 34. Thus, a part to be engaged by the leg piece 20 of the leg member 12 is constructed by the engaging hole 34, the locking plate 38, the ribs 40 and 42 and the lower rib 44. The curl cord 8 is used to connect the data processing unit and the keyboard 10 electrically and is housed in a rectangular shaped curl cord housing recess 50 provided on the lower front of the body cover 1. Moreover, a carrying handle 52 is rotatably provided on the front of the body cover 1.

In operation, as shown in FIG. 1, the keyboard engaging device is functioned such that the leg member 12 projected from surface of independent keyboard 10 is rotated first and then the leg piece 20 of the leg member 12 is inclined lower to be inserted into the engaging hole 34 (as shown by an arrow D). Another leg piece 20 of the leg member 14 is in the same manner inserted into the engaging hole 36 (as shown by an arrow E).

Thereby, the leg piece 20 is passed through the engaging hole 34 and guided slantly by ribs 40, 42 and lower rib 44 and further guided by the projecting portions 40a, 42a of ribs 40 and 42. When the leg piece 20 is further inserted and the top of leg piece 20 is touched upon the convex part 38a of locking plate 38, the leg piece 20 is further moved to raise the convex part.

Finally, the convex part 38a is engaged with the recess 20a of the leg piece 20. This engaging concludes engaging of leg piece 20 and the independent keyboard 10 is engaged with the cover 1 of word processor. Under this engaging conditions, the independent keyboard 10 is rotated in the direction shown by an arrow F in FIG. 4 and tightly fit onto the body cover 1. Then, the independent keyboard 10 is retained and housed by the operation of holding equipment 46 capable of holding the keyboard 10 coupled with the force of a spring and which is rotatably provided on the upper part of the body cover 1 (as shown by K in FIG. 4). In so doing, the CRT 2 screen can be protected with the keyboard 10 and the whole of word processor W can be transferred easily with the keyboard 10 by holding the transferring handle 52.

At the time of housing, the normally intersected plane 22b and leg piece 20 are in contact. The independent keyboard 10 can be rotated in the direction shown by an arrow G in FIG. 4 and placed with the end of independent keyboard 10 in contact with the desk. In this case, the keyboard 10 can be depressed for keying operation. The keyboard after rotated and placed on the desk is marked H as shown in two-dot line in FIG. 4 where the upper surface of independent keyboard 10 is inclined approximately 20 degrees according to the embodiment of the present invention.

Figure 4:
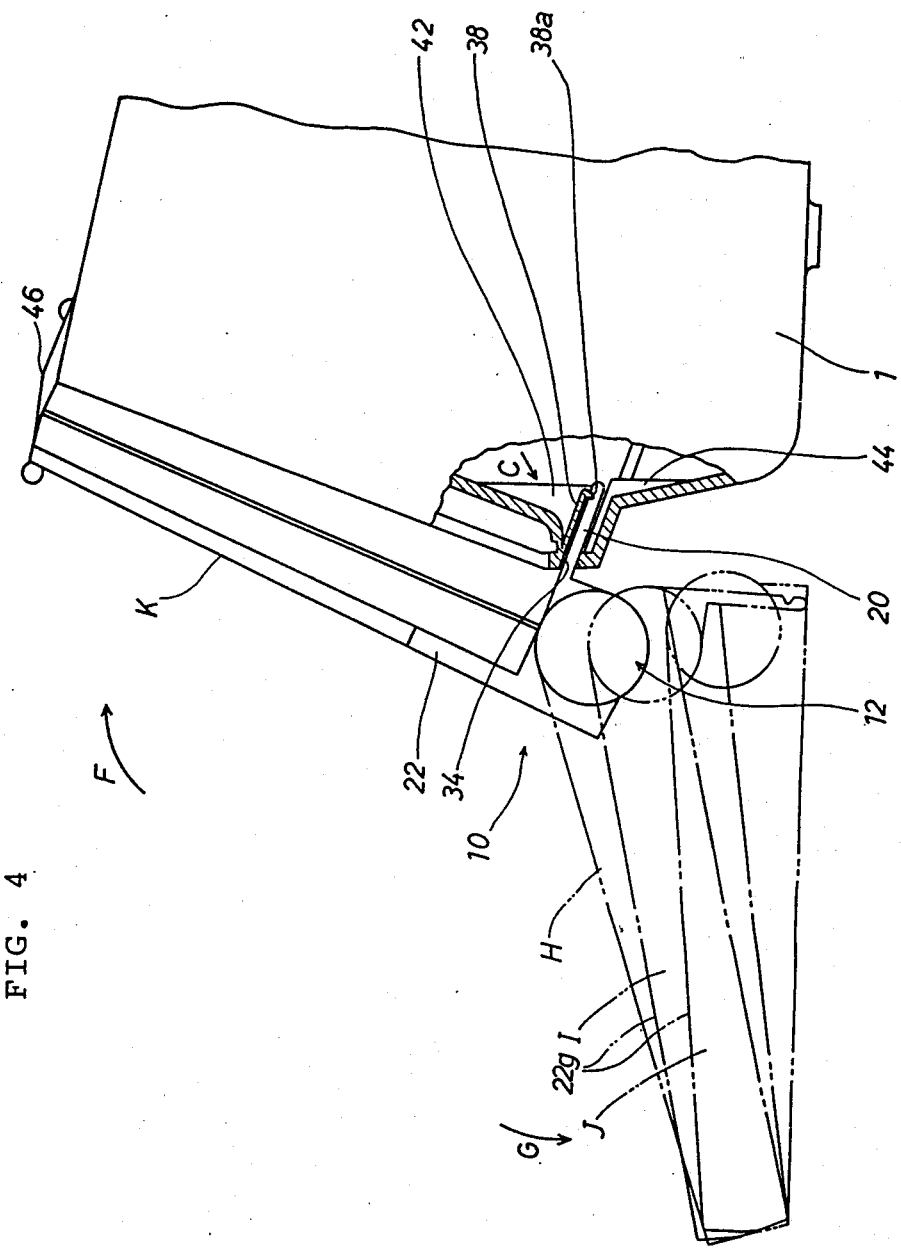
FIG. 4 is a side elevational view of major parts of FIG. 1.
Figure 5:
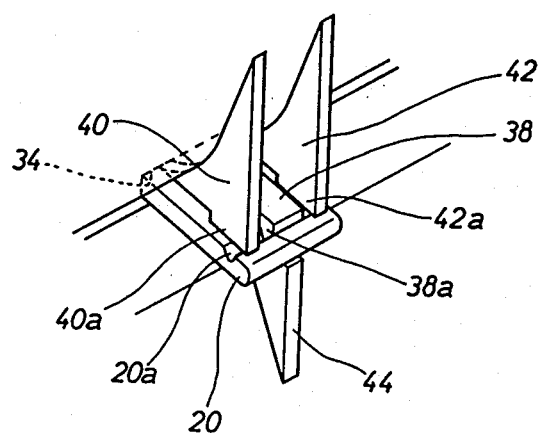
FIG. 5 is a perspective view of major parts of FIG. 4 indicated by arrow C.

Moreover, the banks 16c are provided at both sides of the recess 16b to protect the rectangular convex part 26 of keyboard body 22 from riding on the the banks 16c of leg member 12 within angle range in which the independent keyboard 10 is rotated from housing position to a position marked H in FIG. 4. When the independent keyboard 10 is housed in position, the total weight of keyboard 10 is supported by fulcrum points which are formed by the contact part between the leg piece 20 of leg member 12 and the engaged part consists of the engaging hole 34, the locking plate 38, the ribs 40 and 42 and the lower rib 44.

Similarly, the total working force consisting of the weight of keyboard 10 and a force applied on keyboard 10 by an operator during keying operation is supported by the fulcrum points. Since the engaging hole 34, the projected portions 40a and 42a of ribs 40 and 42, and the upper surface of lower rib 44 and integrally formed of an inclined slope, the total weight is always supported via the fulcrum points on the engaged hole 34 and thus, the leg member 12 is not withdrawn out of the engaging hole 34. The keying operation pressure is applied to depress the leg member 12 further into the engaging hole 34.

According to this embodiment, the convex part 38a of locking plate 38 is engaged with the recess 20a of leg piece 20, thus protecting the leg member 12 from being disengaged from the engaging hole 34. The locking plate 38 can be eliminated corresponding to the degree of slope of engaging hole 34 which can also be arranged horizontally. Withdrawing the leg member 12 in the slantly upward direction bends the locking plate 38 and releases the engaging of convex part 38a with the recess 20a. The leg piece 20 is withdrawn along ribs 40,42 and lower rib 44 from engaging hole 34 and thus the independent keyboard 10 is removed from the body cover 1.

After disengagement, the keyboard 10 can be set on a table ready for keying. The leg pieces 20 are used this time to set the keyboard 10 on the table surface inclined to some degree thereagainst. For this purpose, the knurling knob of leg member 12 is gripped and rotated in clockwise direction in FIG. 4. The bank 16c of the stepped peripheral recess 16a of the outer cylinder 16 is ridden on the rectangular convex 26 and the leg member 12 is moved in the opposite direction to that shown by an arrow B shown in FIG. 2.

The knurling knob is further rotated to engage the rectangular convex part 26 with the rectangular recess 16b, causing the leg member 12 to be moved in the direction shown by an arrow B shown in FIG. 2. The keyboard body 22 is now set on table as shown by I in FIG. 4 where the leg piece 20 is projected from the bottom of keyboard 22. The upper surface 22g of independent keyboard 10 is inclined approximately 12 degrees. Further, the inclination of keyboard 10 can be altered by changing the length of leg piece 20 and set to an arbitrary angle by changing positions either of the rectangular convex part 26 or of the rectangular recess 16b.

Under this condition, the leg member 12 is gripped and withdrawn in the opposite direction to an arrow B to release engaging of the rectangular convex part 26 with the rectangular recess 16b. Then, the leg piece 20 is further rotated to be housed in the concave part 28 of the keyboard body 22 (as shown in two-dot chain line in FIG. 2). The keyboard 10 is then placed on the table as shown by J in FIG. 4 and the upper surface 22g of the keyboard 22 is inclined approximately 5 degrees.

In accordance with the preferred embodiment of the present invention, a pair of leg members 12 and 14 are projected from opposite rearward corners of independent keyboard 10. These leg members can therefore be checked easily from operator's sides, thus enabling leg members 12 and 14 to be withdrawn and engaged easily from/with the engaging hole 34 and 36. As previously described, the independent keyboard 10 can also be used under conditions in which it is engaged.

When it is detached from the word processor body, the knurling knob, projected from the bottom of keyboard body 22 or housed therein of leg members 12 and 14 can be rotated without reversing the keyboard 10. Thus the independent keyboard 10 is placed on a table declining to some degrees for keying operation. During operation, the operator can be relieved of any worry, such as sleeves being caught on the projected leg piece 20 of leg member 12 since they are not projected from the upper surface of keyboard 10.

The keying is smoothly operated either when the keyboard is tilted or when it is being engaged with the word processor. The inclination of the keyboard 10 can be easily changed by rotating or by displacing axially the leg member 12 (tilting member). At the same time, above described functions can be realized by reducing incorporated parts to minimum and by employing simple construction.

Moreover, a plurality of rectangular convex part 26 are arranged on the outer periphery of cylindrical shaft 24 so as to restrict oscillating of the tilting member at a plurality positions or to increase the number of inclination angle positions of keyboard 10. Further, when the body cover 1 is accessed with the keyboard 10, keying operation can be made possible by leaving the curl cord 8 completely housed in the housing recess 50 or by leaving a part of curl cord 8 pulled out of the recess 50.

On the other hand, when the body cover 1 is apart from the keyboard 10, keying operation can be made possible by pulling out the curl cord 8 completely from the housing recess 50. Since the curl cord 8 is housed in the housing recess 50, the keyboard 10 can be connected to the body cover 1 without removing the connector (not shown) for curl cord 8 from the keyboard 10. In this case, as the curl cord 8 is housed securely in the housing recess 50, it does not hinder transfer of keyboard 10 when the keyboard 10 is transferred by holding the transferring handle 52.

Further, when the keyboard 10 is inclined forward (in an opposite direction to that shown by an arrow F in FIG. 4) while the keyboard 10 is being engaged with the body cover 1, keying operation is possible free from entangling of curl cord 8 between the body cover 1 and the keyboard 10. At this time, the curl cord 8 is located behind the keyboard 10 and neatly set for functional beauty when viewed from the operator's side.

The preferred embodiment herein described is only one example and is not offered as a limitation to other practical applications in other preferred embodiments which one of ordinary skill in the art may make without deviating from the spirit and scope of the invention.

What is claimed is:

1. In combination with a data processing unit having a keyboard detachably mounted on a body of said data processing unit, an engaging device comprising:
    engaging means for receiving and holding leg members, said engaging means being formed at a lower front portion of said body of said data processing unit and extending rearwardly into said body;
    said leg members rotatably mounted relative to said keyboard and lockable into at least one predetermined position and selectively engageable with said engaging means; and
    angle adjusting means, connected to said leg members, for rotating said leg members to a predetermined position for adjusting a declination angle between an upper surface of said keyboard and a level surface on which the keyboard rests, thereby allowing an operator to select a plurality of declination angles of the keyboard.

2. Engaging device of a keyboard for a data processing unit according to claim 1, wherein said leg members include a pair of isomorphic configurations, each of said leg members being mounted on a rearward end of said keyboard and comprising:

an outer cylinder having a leg piece extending tangentially therefrom and a ring-shaped surface formed normal to and on an inner surface on one end of said outer cylinder;

a projection formed on a portion of said ring-shaped surface and projecting toward said one end of said outer cylinder;

a recess disposed in a center portion of said projection;

an inner cylinder housed in and coaxially with said outer cylinder; and a recess disposed at an outer end portion of said leg piece and parallel with an axis of said outer cylinder.

3. Engaging device of a keyboard for a data processing unit according to claim 2, wherein said engaging means includes a pair of isomorphic configurations spaced laterally apart from each other, each of said engaging means comprising:

a lateral engaging hole formed on a lower front portion of said body of said data processing unit and being slightly larger in size than said leg piece of said leg member;

a locking plate attached at a front end thereof to an inner surface of said body, extending rearwardly and downwardly, and having a downward convex part at a rear end thereof, fittable into said recess of said leg piece of said leg member when said leg piece is inserted into said engaging hole;

two upper ribs extending rearwardly from an upper edge of said engaging hole, said locking plate being disposed between said two upper ribs, each of said upper ribs having a downward projected portion; and a lower rib extending rearwardly from a lower edge of said engaging hole and disposed beneath said two upper ribs and a clearance formed between said two upper ribs and said lower rib, said clearance guiding said leg piece upon its insertion into the engaging hole.

4. Engaging device of a keyboard for a data processing unit according to claim 3, wherein said locking plate is an elastic plate.

5. Engaging device of a keyboard for a data processing unit according to claim 2, wherein said keyboard includes a cylindrical shaft rotatably supporting each of said leg members, said shaft being inserted into a hollow portion between said outer and inner cylinders of each of said leg members, and having a convex part on an outer surface thereof, fittable into said recess of said projection of said outer cylinder.

6. Engaging device of a keyboard for a data processing unit according to claim 2, wherein each of said leg members includes a coil spring between said inner cylinder and said keyboard.

7. Engaging device of a keyboard for a data processing unit according to claim 2, wherein said outer cylinder has a gripping rim around an outer circumferential surface thereof and is capped on an outer end thereof.

8. Engaging device of a keyboard for a data processing unit according to claim 7, wherein said inner cylinder is connected to said capped end.

9. Engaging device of a keyboard for a data processing unit according to claim 2, wherein said projection declines at each side of said recess.

10. Engaging device of a keyboard for a data processing unit according to claim 1, wherein said leg members enable the keyboard to rotate, when said leg members engage with said engaging means, between an engaged working position and a closed position where the keyboard rests on the front portion of the body of the data processing unit, and a declination angle of said keyboard in said engaged working position is larger than a declination angle of said keyboard in a working position when said leg members are disengaged from said engaging means, a declination angle is defined between an upper surface of said keyboard and a level surface on which said keyboard rests.

11. In combination with a data processing unit having a keyboard detachably and tiltably mounted on a body of said data processing unit, a tilt device of said keyboard comprising:

recesses formed at both rear corners of said keyboard;

a tilting member supported in each of said recesses rotatably around and movably along a shaft attached to said keyboard and having a leg piece projectable from a base surface of said keyboard when said tilting member rotates;

a resilient member activating said tilting member in the direction of said shaft, said resilient member attached at one end thereof to said tilting member and at another end thereof to said keyboard; and lock means for locking rotation of said tilting member around said shaft at a predetermined position by engaging two locking members with each other when said tilting member rotates, one of said two locking members being attached to said tilting member and the other attached to said shaft.

* * * * *